United States Patent [19]

Fujiki et al.

[11] Patent Number: 4,700,848
[45] Date of Patent: Oct. 20, 1987

[54] UMBRELLA HOLDER FOR VEHICLE

[75] Inventors: Hiroyuki Fujiki, Isehara; Yoshiharu Michiura, Chigasaki; Masafumi Abe, Atsugi, all of Japan

[73] Assignee: Nissan Motor Co., Ltd., Tokyo, Japan

[21] Appl. No.: 947,713

[22] Filed: Dec. 30, 1986

[30] Foreign Application Priority Data

Jan. 10, 1986 [JP] Japan .................................. 61-3195

[51] Int. Cl.⁴ .............................................. A47F 7/00
[52] U.S. Cl. .................................... 211/63; 224/915
[58] Field of Search ................. 211/63, 62, 87, 60.1; 224/915, 42.45 R, 273

[56] References Cited

U.S. PATENT DOCUMENTS

| 3,124,287 | 3/1964 | Belzer | 211/63 X |
| 3,526,238 | 9/1970 | Brayton | 211/63 X |
| 4,009,854 | 3/1977 | Moyer | 211/63 X |
| 4,378,888 | 4/1983 | Reed | 211/63 |

FOREIGN PATENT DOCUMENTS 56-16146 4/1981 Japan .
57-14265 9/1982 Japan .
60-87841 6/1985 Japan .

Primary Examiner—Robert W. Gibson, Jr.
Attorney, Agent, or Firm—Pennie & Edmonds

[57] ABSTRACT

Herein disclosed is an umbrella holder which comprises an elongate casing, a tip holder axially movably disposed in the casing and having a catch portion by which a tip portion of an umbrella is caught upon insertion of the umbrella into the casing through an umbrella inlet opening of the casing, a biasing structure for biasing the tip holder toward the umbrella inlet opening, a locking device for locking the tip holder at a desired position relative to the elongate casing, and an unlocking device for disabling the locking device when the tip holder is rotated in a given direction about the axis thereof.

18 Claims, 14 Drawing Figures

FIG.13
(Prior Art)
FIG.14
(Prior Art)
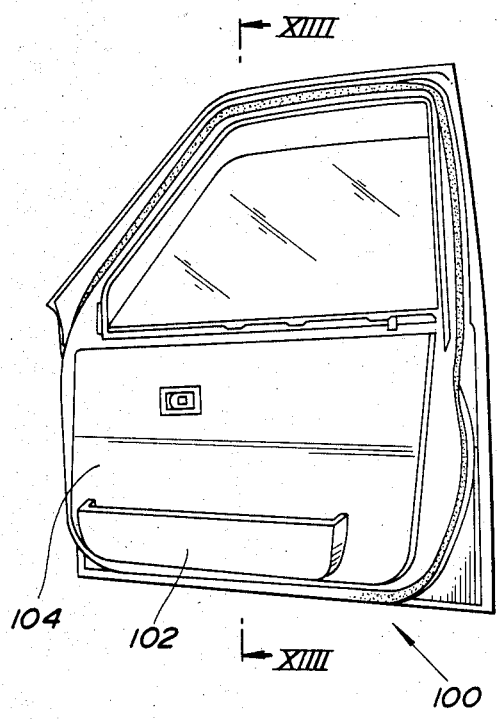
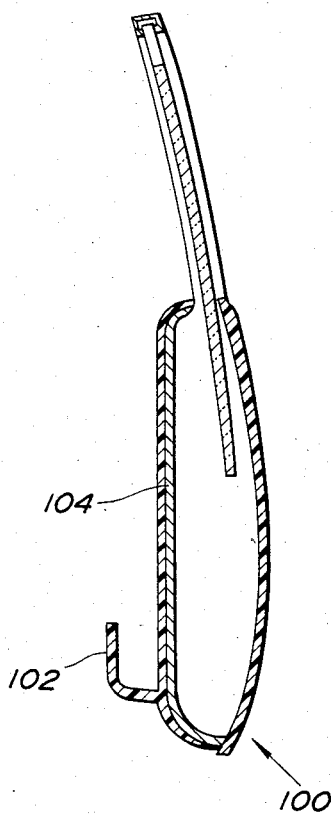

UMBRELLA HOLDER FOR VEHICLE

BACKGROUND OF THE INVENTION

1. Field of the Invention

The present invention relates in general to a holder for holding some articles, and more particularly to an umbrella holder installed in a motor vehicle for holding an umbrella.

2. Description of the Prior Art

In order to clarify the task of the present invention, some conventional holders installed in motor vehicles will be described with reference to FIGS. 13 and 14 of the accompanying drawings.

As is seen from the drawings, some of the motor vehicles of these days are equipped with doors 100 of a type having a pocket 102 mounted to an inside panel 104 of the door 100. Small articles, such as glove, cigarette, sunglasses or the like, can be put in the pocket 102. However, due to its inherent dimensional limitation, elongate things, such as an umbrella or the like, can not be neatly put into the pocket 102.

In view of the above, umbrella holders have been hitherto proposed, some of which are disclosed in Japanese Utility Model First Provisional Publication No. 57-142652 and Japanese Utility Model Second Provisional Publication No. 56-16146, which are constructed to be adjustable in length to the lengthes of umbrellas. That is, in these conventional umbrella holders, two elongate plate members each having an umbrella gripper are telescopically connected at their inward end portions. When in use, the two plate members are expanded or contracted to adjust the entire length thereof to the length of the umbrella which is to be held by the holder. However, these umbrella holders have the following drawbacks.

First, manipulation of the umbrella holders is troublesome. That is, in case of the holder of the former publication, awkward banding work is necessary for fixing the umbrella after the umbrella has been put on the holder. In case of the holder of the latter publication, the length adjustment of the holder needs a troublesome loosening and tightening work for a connecting screw by which the two elongate plate members are fastened.

Second, the holders disclosed by these publications are constructed to support the umbrella having the same exposed to the interior of the passenger's cabin. Thus, if the umbrella held by the holder is drenched with rain, the umbrella tends to wet the clothe of the passenger.

SUMMARY OF THE INVENTION

It is therefore an essential object of the present invention to provide an improved umbrella holder which is free of the above-mentioned drawbacks.

It is an object of the present invention to provide an umbrella holder which is constructed to simplify the manipulation with which an umbrella is put into and drawn from the umbrella holder.

It is another object of the present invention to provide an umbrella holder which is so constructed that deeper insertion of the umbrella into the holder, brings about a locking of the umbrella to the holder.

According to the present invention, there is provided an umbrella holder which comprises an elongate casing having one end opened and the other end closed, a tip holder axially movably disposed in the elongate casing, the tip holder having a catching portion by which a tip portion of an umbrella is caught upon insertion of the umbrella into the casing through the opened end, first biasing means for biasing the tip holder toward the opened end, locking means for locking the tip holder at a desired position relative to the elongate casing, the locking means suppressing the tip holder from moving toward the opened end while permitting the same from moving toward the closed end, and unlocking means disabling the locking means when the tip holder is rotated in a given direction about the axis thereof.

BRIEF DESCRIPTION OF THE DRAWINGS

FIG. 13 is a perspective view of a vehicle door which is equipped with a conventional door pocket; and FIG. 14 is a cross sectional view taken along the line XIV—XIV in FIG. 13.

DETAILED DESCRIPTION OF THE INVENTION

Figure 1:
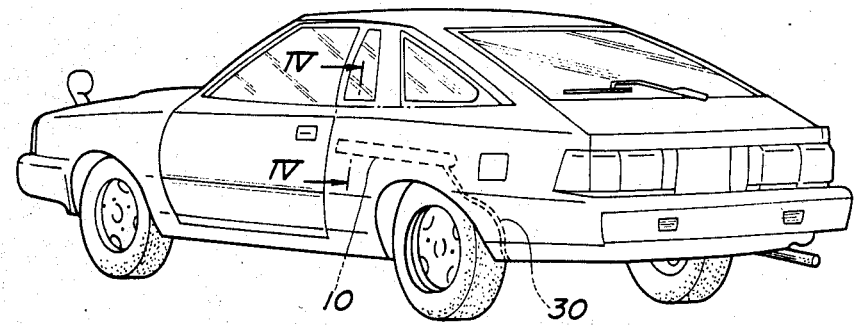
FIG. 1 is a perspective view of a passenger motor vehicle which is equipped with an umbrella holder according to the present invention.
Figure 2:
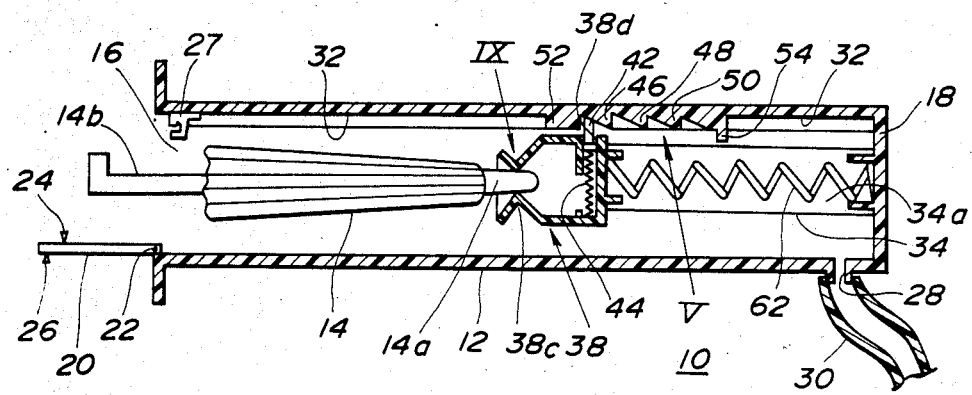
FIG. 2 is a longitudinally sectional view of an umbrella holder of a first embodiment of the present invention, showing a condition wherein an umbrella is about to be held in the holder.
Figure 3:
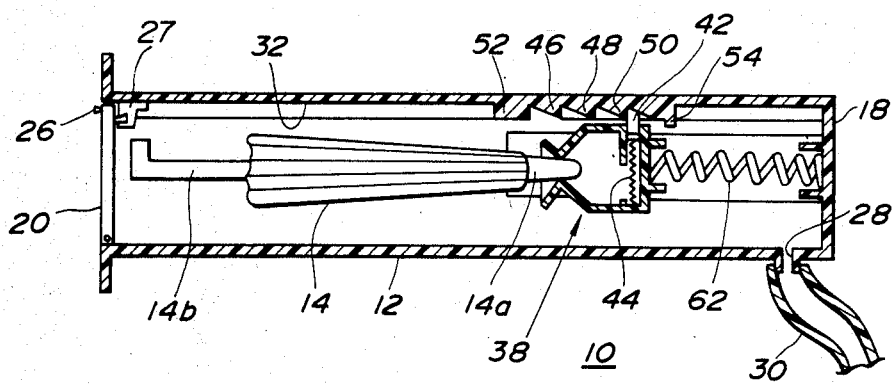
FIG. 3 is a view similar to FIG. 2, but showing a condition wherein the umbrella is tightly held in the holder.
Figure 4:
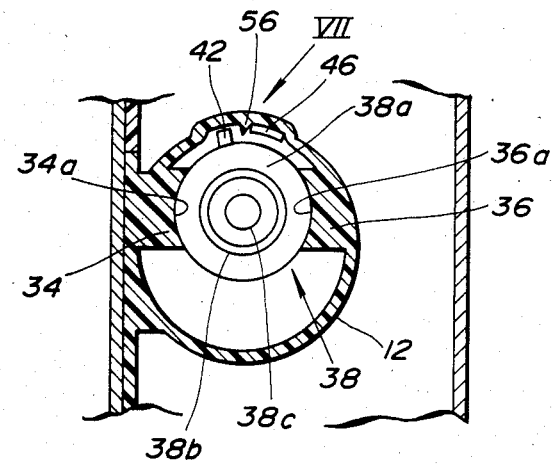
FIG. 4 is an enlarged vertically sectional view of the umbrella holder of the first embodiment, which is taken along the line IV—IV of FIG. 1.
Figure 5:
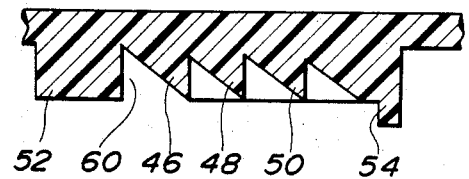
FIG. 5 is an enlarged view of a toothed portion indicated by an arrow V in FIG. 2.
Figure 6:
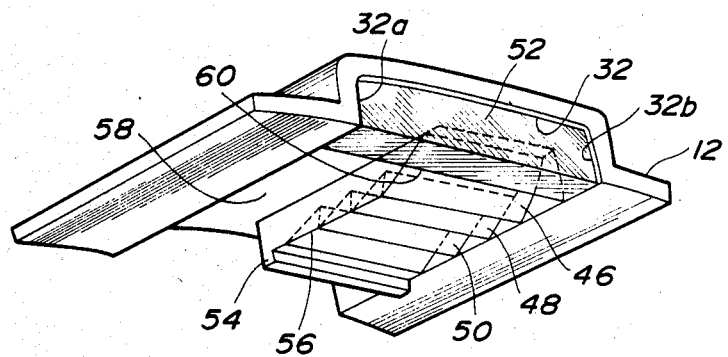
FIG. 6 is an enlarged perspective view of the toothed portion.
Figure 7:
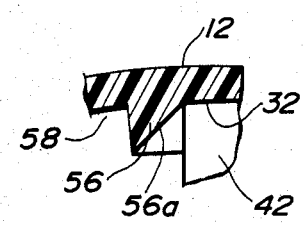
FIG. 7 is an enlarged view of a guide ridge indicated by an arrow VII in FIG. 4.
Figure 8:
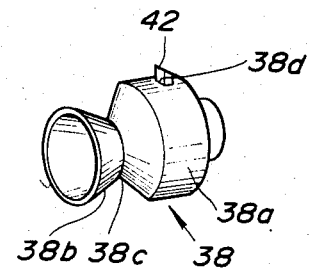
FIG. 8 is a perspective view of a tip holder employed in the umbrella holder of the invention.
Figure 9:
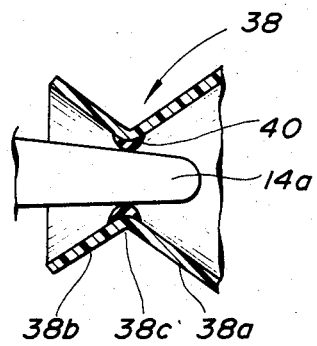
FIG. 9 is an enlarged view of the portion indicated by an arrow IX in FIG. 2.

Referring to FIGS. 1 to 10, particularly FIGS. 2 and 3, there is shown an umbrella holder 10 of a first embodiment of the present invention. As is shown in FIG. 1, the umbrella holder 10 is mounted to, for example, an inside panel of a motor vehicle.

As is seen from FIG. 2, the umbrella holder 10 comprises an elongate tubular casing 12 the length of which is sufficient enough to receive therein the entire of an umbrella 14. The casing 12 has at its longitudinal one end an umbrella inlet opening 16 through which the umbrella 14 passes upon egress and ingress of the same relative to the casing 12. The tubular casing 12 further has the other end which is closed by a wall 18. A lid member 20 is pivotally connected through a pivot pin 22 to a lower portion of the umbrella inlet opening 16 in a manner to close and open the opening 16. The lid member 20 is provided at its inside surface with a boss 24 which is lockingly caught, upon closing of the lid member 20, by a catch member 27 fixed to an upper portion of the umbrella inlet opening 16. A knob 26 is fixed to an outisde surface of the lid member 20 for facilitating manipulation of the lid member 20. The tubular casing 12 is formed near the wall 18 with a drain opening 28 to which a drain hose 30 is connected. The drain hose 30 extends therefrom to a rear lower portion of the vehicle where the hose 30 is exposed to the outside of the vehicle, as is understood from FIG. 1.

The inner cylindrical surface of the tubular casing 12 is formed at its upper portion with an elongate groove 32 which extends longitudinally throughout the length of the tubular casing 12. Furthermore, as is seen from FIGS. 2 and 4, a pair of supporting banks 34 and 36 are provided within the casing 12, which extend from the end wall 18 of the casing 12 to a middle portion of the same. As is seen from FIG. 4, the supporting banks 34 and 36 are formed at their mutually facing surfaces with concave grooves 34a and 36a each extending longitudinally.

Axially slidably supported by the paired banks 34 and 36 is a tip holder 38 which functions to catch a tip of the umbrella 14 in such a manner as will become apparent as the description proceeds. The tip holder 38 is rotatable about the axis thereof relative to the paired banks 34 and 36. As is seen from FIG. 8, the tip holder 38 comprises a cylindrical major portion 38a which is slidably put between the opposed concave grooves 34a and 36a of the banks 34 and 36, and a frusto-conical portion 38b which is coaxially connected to the cylindrical portion to form therebetween a throttled neck portion 38c (see FIG. 9). An annular rubber member 40 is tightly disposed within the neck portion 38c. As is seen from FIG. 2, the tip holder 38 is formed at the cylindrical portion thereof with a bore 38d which is defined in a thicker wall part of the cylindrical portion 38a. Upon proper assembly, the tip holder 38 is arranged with the bore 38d facing upward, that is, toward the elongate groove 32 of the tubular casing 12.

A lock mechanism is further arranged to lock the tip holder 38 at a desired postion relative to the tubular casing 12. The mechanism comprises a locking pawl 42 which is slidably received in the bore 38d of the tip holder 38 with its top somewhat projected therefrom, as is understood from FIG. 8. A spring 44 is disposed in the tip holder 38 to bias the locking pawl 42 outward.

The lock mechanism further comprises a series of ratchet teeth 46, 48 and 50 which are integrally formed on the bottom (or ceiling) of the elongate groove 32 near the middle portion of the tubular casing 12. These teeth 46, 48 and 50 are arranged between forward and rearward stoppers 52 and 54 which are integral with the bottom. As is seen from FIG. 6, the forward stopper 52 extends laterally entirely between the opposed side walls 32a and 32b of the groove 32, while the rearward stopper 54 extends laterally to a half of the groove. As is best seen from FIGS. 6 and 7, a guide ridge 56 is arranged beside the series of the teeth 46, 48 and 50 in a manner to extend longitudinally between the forward and rearward stoppers 52 and 54. As is seen from FIG. 7, the guide ridge 56 is formed with an inclined surface 56a which faces toward the teeth 46, 48 and 50. As is seen from FIG. 6, the structure including the teeth 46, 48 and 50, the rearward stopper 54 and the guide ridge 56 is located at one lateral side of the groove 32 leaving at the other lateral side a return way 58 which is defined between the guide ridge 56 and the side wall 32a of the groove 32. It is to be noted that a gap 60 is defined between the forefront tooth 46 and the forward stopper 52, which is exposed at its one side to the return way 58. A coil spring 62 extends between the tip holder 38 and the end wall 18 of the casing 12 passing through an elongate space defined between the opposed paired banks 34 and 36. The spring 62 is arranged not only to bias the tip holder 38 to move toward the umbrella inlet opening 16 but also to bias the same to turn in a clockwise direction in FIG. 4.

Upon assembly, the tip holder 38 is put between the paired banks 34 and 36 bringing the projected top of the locking pawl 42 from the opening 38d into engagement with one of the gaps of the teeth 46, 48 and 50. Under this condition, due to inherency of the ratchet teeth, the tip holder 38 is suppressed from moving toward the umbrella inlet opening 16 while being permitted to move toward the closed wall 18.

In the following, operation of the umbrella holder 10 will be described. For ease of understanding, the description will be commenced with respect to a condition wherein the tip holder 38 is locked at its forefront or home position, that is, the position as shown in FIG. 2.

The lid member 20 is opened and the umbrella 14 is inserted through the inlet opening 16 into the casing 12 with its tip 14a directed toward the tip holder 38. The inward movement of the umbrella 14 brings about the engagement of the umbrella tip 14a with the rubber-mounted neck portion 38c of the tip holder 38, as is seen from FIG. 2. Further movement of the umbrella 14 moves the tip holder 38 in the same direction against the biasing force of the spring 62. When, upon complete insertion of the umbrella 14 into the casing 12, the umbrella 14 is released from the external force with which the umbrella 14 is urged to move into the casing 12, the tip holder 38 is locked at a new position with the locking pawl 42 lockingly engaged with one of the teeth 48 and 50, as is seen from FIG. 3. Then, the lid member 20 is closed. It is to be noted that water dropped from the umbrella 14 is drained through the drain opening 28 and the drain hose 30. It is thus preferable to mount the umbrella holder 10 with its longitudinal axis inclined, as is seen from FIG. 1.

Upon requirement of drawing the umbrella 14 from the holder 10, the lid member 20 is opened. Then, the umbrella 14 is turned in a counterclockwise direction in FIG. 4 about the axis thereof with the umbrella grip 14b manipulated by an umbrella user. With this turning, the tip holder 38 is turned in the same direction causing the projected top of the locking pawl 42 to get over the guide ridge 56 and drop into the return way 58. Thus, thereafter, the tip holder 38 and thus the umbrella 14 are moved toward the umbrella inlet opening 16 by the action of the spring 62, and stopped when the projected top of the locking pawl 42 is brought into engagement with the forward stopper 52 (see FIG. 6). With this, the grip 14b of the umbrella 14 is sufficiently projected from the umbrella inlet opening 16 thereby facilitating the drawing of the umbrella 14 from the holder 10. It is to be noted that due to the twisting force of the spring 62, the tip holder 38 is automatically turned in a clockwise direction in FIG. 4 travelling the locking pawl 42 in the gap 60 (see FIG. 6) and assumes its home position, that is, the position as shown in FIG. 2.

Figure 10:
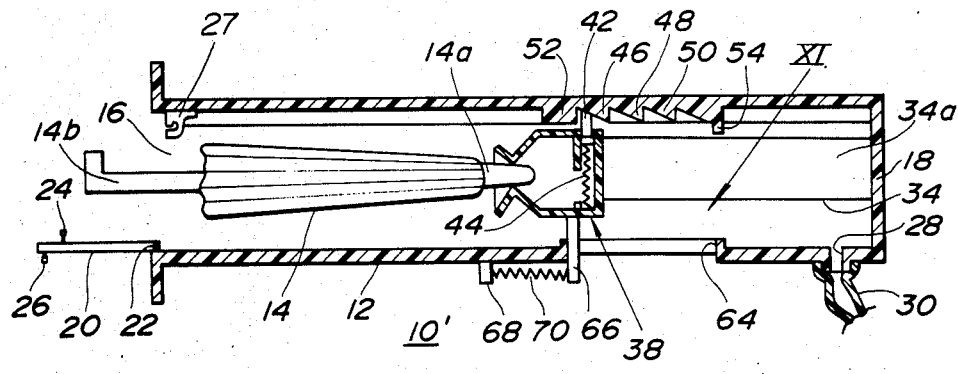
FIG. 10 is a view similar to FIG. 2, but showing an umbrella holder of a second embodiment of the present invention.
Figure 11:
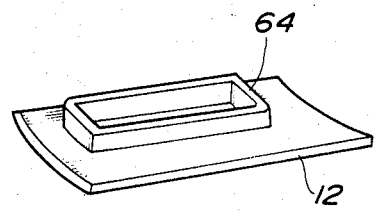
FIG. 11 is a perspective view of a framed rectangular opening indicated by an arrow XI in FIG. 10.

Referring to FIGS. 10 and 11, particularly FIG. 10, there is shown an umbrella holder 10' of a second embodiment of the present invention. The umbrella holder 10' of this embodiment is substantially the same as that of the first embodiment 10 except the biasing means which biases the tip holder 38. That is, in the second embodiment, as a substitute for the coil spring 62 of the first embodiment, the following biasing device is employed.

In the second embodiment, a framed rectangular opening 64 is formed in the lower portion of the casing 12 at a position facing the teeth 46, 48 and 50. A rod 66 is secured to the tip holder 38 and projected partially from the rectangular opening 64. A retainer 68 is fixed to the casing 12 near the opening 64. A spring 70 is arranged between the projected portion of the rod 66 and the retainer 68 to bias the tip holder 38 toward the umbrella inlet opening 16.

With the arrangement as described hereinabove, the umbrella holder 10' of the second embodiment operates in substantially the same manner as the first embodiment 10. However, in the second embodiment, the automatic home positioning of the tip holder 38 is not effected. Thus, it is necessary to slightly turn the umbrella in a clockwise direction before the umbrella pushes the tip holder 38.

Figure 12:
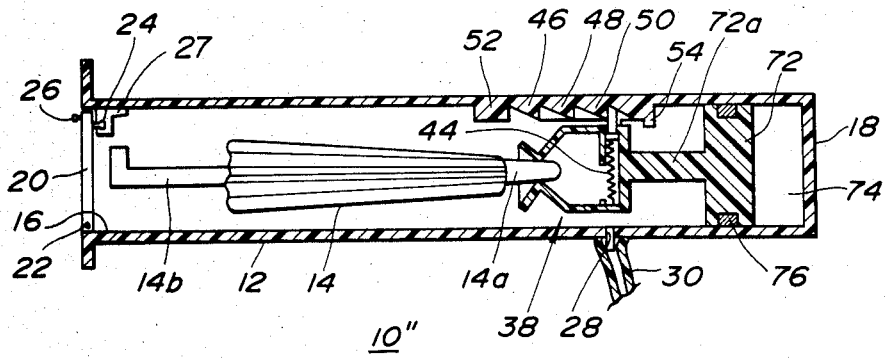
FIG. 12 is a view similar to FIG. 2, but showing an umbrella holder of a third embodiment of the present invention.

Referring to FIG. 12, there is shown an umbrella holder 10" of a third embodiment of the present invention. Also this embodiment is substantially the same as the first embodiment 10 except the biasing means. That is, in the third embodiment, a pneumatic biasing means is employed as a substitute for the coil spring 62 of the first embodiment, as will be described in the following.

In the third embodiment 10", a piston member 72 is sealingly and slidably disposed in the tubular casing 12 at a position between the rearward stopper 54 and the end wall 18 to define a sealed work chamber 74. The piston member 72 has a stem portion 72 which is integrally and coaxially connected to the tip holder 38, so that the piston member 72 and the tip holder 38 move together. Designated by numeral 76 is a seal ring which is disposed about the piston member 72 to achieve hermetical sealing between the piston member 72 and the inner cylindrical surface of the casing 12. The work chamber 74 is filled with a pressurized air or gas in order to bias the piston member 72 and thus the tip holder 38 toward the umbrella inlet opening 16. The drain opening 28 is located away from the work chamber 74.

With the arrangement as described hereinabove, the umbrella holder 10" of the third embodiment operates in substantially the same manner as the second embodiment 10'.

In the above-mentioned first, second and third embodiments 10, 10' and 10", a so-called "ratchet tooth mechanism" is employed for locking the tip holder 38 at a desired position. However, in the invention, any kinds of mechanisms may be employed as a substitute for such mechanism so long as they can carry out a so-called "push-on, push-release action" wherein first push causes a lock at a position and second push causes an unclock at the position.

As is understood from the foregoing description, the umbrella holder of the present invention simplifies the manipulation with which the umbrella is put into and drawn from the holder. Furthermore, by the provision of the lockable tip holder 14a, the umbrella 14 can be stably held in the holder. Furthermore, since the umbrella holder is constructed to conceal the entire of the umbrella 14, wetting the clothe of the passenger with a drenched umbrella does not occur.

What is claimed is:

1. An umbrella holder comprising:
   an elongate casing having one end opened and the other end closed;
   a tip holder axially movably disposed in said elongate casing, said tip holder having a catching portion by which a tip portion of an umbrella is caught upon insertion of the umbrella into the casing through the opened end;
   first biasing means for biasing said tip holder toward the opened end;
   locking means for locking said tip holder at a desired position relative to said elongate casing, said locking means suppressing said tip holder from moving toward the opened end while permitting the same from moving toward the closed end; and
   unlocking means disabling said locking means when said tip holder is rotated in a given direction about the axis thereof.

2. An umbrella holder as claimed in claim 1, in which said locking means comprises:
   a series of ratchet teeth formed on an inner surface of said elongate casing and aligned along the axis of said casing;
   a locking pawl axially slidably supported by said tip holder with its top projectable therefrom into one of gaps defined by the teeth; and
   second biasing means for biasing said locking pawl outward from said tip holder.

3. An umbrella holder as claimed in claim 2, in which said locking means further comprises forward and rearward stoppers between which said teeth are arranged, said stoppers suppressing excess movement of said tip holder in the axial direction.

4. An umbrella holder as claimed in claim 3, in which said unlocking means comprises:
   a guide ridge arranged beside the series of the teeth to define a return way which extends along the axis of the elongate casing;
   means for connecting said return way with a gap which is defined by a forefront one of the teeth;
   whereby when said tip holder is urged to rotate in said given direction, the same is rotated in the direction having the top portion of the locking pawl getting over the guide ridge and dropping into said return way.

5. An umbrella holder as claimed in claim 4, in which said guide ridge is formed with an inclined surface at its one side facing toward said teeth in order to facilitate the getting over movement of the top portion of the locking pawl relative to said guide ridge.

6. An umbrella holder as claimed in claim 5, further comprising guide means by which the axial movement of said tip holder in the elongate casing is guided.

7. An umbrella holder as claimed in claim 6, in which said guide means comprises two parallel supporting banks which are provided within the elongate casing and extend between the closed end of the elongate casing and a generally middle portion of the same, said tip holder being supported by said supporting banks with its outer surface slidably engaged with mutually opposed surfaces of the supporting banks.

8. An umbrella holder as claimed in claim 7, in which said tip holder has a cylindrical outer surface and in which said mutually opposed surfaces of the supporting banks form respective concave grooves, so that when assembled, said tip holder is smoothly rotatable about its axis relative to said supporting banks.

9. An umbrella holder as claimed in claim 8, in which said first biasing means comprises a coil spring which extends between said tip holder and the closed end of the casing passing through an elongate space defined between the two supporting banks.

10. An umbrella holder as claimed in claim 9, in which said coil spring is arranged not only to bias the tip holder to move toward the opened end but also to bias the same to turn in a direction away from said return way.

11. An umbrella holder as claimed in claim 8, in which said first biasing means comprises:
   means defining an opening formed in said elongate casing;
   a rod secured to said tip holder and extending through said opening to the outside of the elongate casing; and
   a spring having one end connected to said elongate casing and the other end connected to the ouwardly projected portion of the rod.

12. An umbrella holder as claimed in claim 5, in which said first biasing means comprises:
   a piston member sealingly and slidably disposed in said elongate casing to define therein a sealed work chamber, said piston member being connected to said tip holder to move therewith; and
   a pressurized gas contained in said work chamber to bias said piston member toward the opened end.

13. An umbrella holder as claimed in claim 12, in which said work chamber has a circular cross section.

14. An umbrella holder as claimed in claim 1, in which said tip holder comprises:
   a cylindrical major portion; and
   a frusto-conical portion coaxially connected to said cylindrical major portion to form therebetween a throttled neck portion; and
   an annular rubber member tightly disposed within said neck portion.

15. An umbrella holder as claimed in claim 1, further comprising a lid member which is pivotally connected to said elongate casing to close and open the opened end of the casing.

16. An umbrella holder as claimed in claim 15, further comprising latch means by which said lid member can be latched to said elongate casing.

17. An umbrella holder as claimed in claim 1, in which said elongate casing is formed with a drain opening.

18. An umbrella holder as claimed in claim 5, in which said series of teeth, the forward and rearward stoppers, the guide ridge and the return way are all formed in a bottom portion of an elongate groove which is formed in an inner surface of said tubular casing to extend along the axis of the casing.

* * * * *